United States Patent
Ohki

(10) Patent No.: US 9,062,355 B2
(45) Date of Patent: Jun. 23, 2015

(54) CARBONITRIDING METHOD, MACHINERY COMPONENT FABRICATION METHOD, AND MACHINERY COMPONENT

(75) Inventor: Chikara Ohki, Kuwana (JP)

(73) Assignee: NTN CORPORATION, Osaka (JP)

( * ) Notice: Subject to any disclaimer, the term of this patent is extended or adjusted under 35 U.S.C. 154(b) by 1674 days.

(21) Appl. No.: 12/296,054

(22) PCT Filed: Apr. 3, 2007

(86) PCT No.: PCT/JP2007/057438
§ 371 (c)(1),
(2), (4) Date: Oct. 3, 2008

(87) PCT Pub. No.: WO2007/116875
PCT Pub. Date: Oct. 18, 2007

(65) Prior Publication Data
US 2010/0154937 A1    Jun. 24, 2010

(30) Foreign Application Priority Data
Apr. 7, 2006   (JP) .................................. 2006-106330

(51) Int. Cl.
| | |
|---|---|
| C23C 8/32 | (2006.01) |
| C21D 9/40 | (2006.01) |
| C21D 1/06 | (2006.01) |
| C21D 1/76 | (2006.01) |
| C21D 9/32 | (2006.01) |

(Continued)

(52) U.S. Cl.
CPC .. *C21D 9/40* (2013.01); *C21D 1/06* (2013.01); *C21D 1/74* (2013.01); *C21D 1/76* (2013.01);
(Continued)

(58) Field of Classification Search
CPC ............ C21D 11/00; C21D 1/06; C21D 1/74; C21D 1/76
USPC .......................................... 148/215, 218, 318
See application file for complete search history.

(56) References Cited

U.S. PATENT DOCUMENTS

| | | | |
|---|---|---|---|
| 4,386,972 A | * | 6/1983 | Knight .......................... 148/218 |
| 5,456,766 A | | 10/1995 | Beswick et al. |

FOREIGN PATENT DOCUMENTS

| | | | |
|---|---|---|---|
| JP | 57016165 A | * | 1/1982 |
| JP | 7-173602 | | 7/1995 |

(Continued)

OTHER PUBLICATIONS

English Abstract of JP 57016165 A (Jan. 1982).*

(Continued)

*Primary Examiner* — Jie Yang
(74) *Attorney, Agent, or Firm* — McDermott Will & Emery LLP

(57) ABSTRACT

A carbonitriding method that can improve the nitrogen permeating rate to render the carbonitriding process effective includes an atmosphere control step, and a heating pattern control step. The atmosphere control step includes an undecomposed $NH_3$ partial pressure control step, and a $CO/CO_2$ partial pressure control step. The undecomposed $NH_3$ partial pressure control step and the $CO/CO_2$ partial pressure control step are carried out in the atmosphere control step such that $a_c^*$ defined by the following equation (1) is at least 0.88 and not more than 1.27, and $\alpha$ defined by equation (2) is at least 0.012 and not more than 0.020, where $P_N$ is the undecomposed ammonia partial pressure and $P_H$ is the hydrogen partial pressure in the heat treatment furnace, wherein $$a_c^* = \frac{(P_{CO})^2}{K \times P_{CO_2}} \quad (1)$$

$P_{CO}$: partial pressure of carbon monoxide (atm), $P_{CO_2}$: partial pressure of carbon dioxide (atm)
K: equilibrium constant at $<C>+CO_2 \Leftrightarrow 2CO$ $$\alpha = \frac{P_N}{0.006 \times (P_H)^{\frac{3}{2}}} \times \frac{(1.877 - 1.055 \times a_c^*)}{100}. \quad (2)$$

6 Claims, 5 Drawing Sheets

(51) Int. Cl.
  *C21D 9/36* (2006.01)
  *C23C 8/30* (2006.01)
  *C21D 1/74* (2006.01)
  *C21D 11/00* (2006.01)

(52) U.S. Cl.
  CPC .. *C21D 9/32* (2013.01); *C21D 9/36* (2013.01); *C21D 11/00* (2013.01); *C23C 8/30* (2013.01); *C23C 8/32* (2013.01)

(56) References Cited

FOREIGN PATENT DOCUMENTS

| JP | 8-13125 | 1/1996 |
|---|---|---|
| JP | 2000-87214 | 3/2000 |
| JP | 2001-11597 | 1/2001 |
| JP | 2002-69609 | 3/2002 |
| JP | 2007-154293 | 6/2007 |

OTHER PUBLICATIONS

NPL: English translation of JP57016165A, Jan. 1982.*
Tsunekawa, Y., et al., "Void Formation and Nitrogen Diffusion on Gas Carbonitriding," Heat Treatment, 1985, p. 242-247, vol. 25, No. 5.
Decision to Grant Patent (with English translation) issued in Basic Japanese Application No. JP 2006-106330, mailed Aug. 26, 2008 (Partial English translation).

* cited by examiner

CARBONITRIDING METHOD, MACHINERY COMPONENT FABRICATION METHOD, AND MACHINERY COMPONENT

RELATED APPLICATIONS

This application is the U.S. National Phase under 35 U.S.C. §371 of International Application No. PCT/JP2007/057438, filed on Apr. 3, 2007, which in turn claims the benefit of Japanese Application No. 2006-106330, filed on Apr. 7, 2006, the disclosures of which Applications are incorporated by reference herein.

TECHNICAL FIELD

The present invention relates to a carbonitriding method, a fabrication method of a machinery component, and a machinery component. More particularly, the present invention relates to a carbonitriding method for carbonitriding a workpiece formed of steel that contains at least 0.8 mass % of carbon, a fabrication method of a machinery component including the step of carbonitriding a workpiece formed of steel that contains at least 0.8 mass % of carbon, and a machinery component formed of steel that contains at least 0.8 mass % of carbon, subjected to carbonitriding.

BACKGROUND ART

Generally in a carbonitriding process, particularly in a gas carbonitriding process applied to a workpiece formed of steel, the atmosphere in a heat treatment furnace is controlled by introducing RX gas and ammonia ($NH_3$) gas into the heat treatment furnace at a constant flow rate (supplied amount), and controlling the carbon potential ($C_P$) value in the heat treatment furnace based on the partial pressure of carbon dioxide ($CO_2$) in the heat treatment furnace. It is difficult to directly measure the amount of nitrogen permeating into the surface layer of the workpiece during the carbonitriding process. In most cases, the amount of nitrogen permeating into the surface layer of the workpiece is controlled by adjusting the flow rate of ammonia gas that can be directly measured during a carbonitriding process, subsequent to empirically determining the relationship between the flow rate of ammonia gas and the amount of nitrogen permeating into the surface layer of a workpiece from past records of actual production in association with each heat treatment furnace.

The flow rate of ammonia gas is determined empirically, taking into account the mass, configuration and the like of the workpiece, based on the past records of actual production with respect to each heat treatment furnace. In the case where a workpiece of an amount or configuration whose records of actual production are not available is to be subjected to a carbonitriding process, the optimum flow rate of ammonia gas in the relevant carbonitriding process must be determined by trial and error. It is therefore difficult to render the quality of the workpiece stable until the optimum ammonia gas flow rate is determined. Moreover, since the trial and error must be carried out at the production line, workpieces that do not meet the required quality will be produced, leading to the possibility of increasing the production cost.

There is proposed a method of controlling the amount of nitrogen permeating into the workpiece by adjusting the undecomposed ammonia concentration (the concentration of residual ammonia gas) that is the concentration of gaseous ammonia remaining in the heat treatment furnace (Yoshiki Tsunekawa et al., "Void Formation and Nitrogen Diffusion on Gas Carbonitriding" Heat Treatment, 1985, Vol. 25, No. 5, pp. 242-247 (Non-Patent Document 1) and Japanese Patent Laying-Open No. 8-013125 (Patent Document 1)), instead of controlling the flow rate of ammonia gas that varies depending upon the configuration of the heat treatment furnace, as well as upon the amount and configuration of each workpiece. Specifically, the undecomposed ammonia concentration that can be measured during a carbonitriding process is identified, and the flow rate of ammonia gas is adjusted based on the relationship between the undecomposed ammonia concentration and the amount of nitrogen permeating into the workpiece, which can be determined irrespective of the configuration of the heat treatment furnace and/or the amount and configuration of the workpiece. It is therefore possible to control the amount of nitrogen permeating into the workpiece without having to determine the optimum ammonia gas flow rate by trial and error. Therefore, the quality of the workpiece can be stabilized.

Non-Patent Document 1: Yoshiki Tsunekawa et al., "Void Formation and Nitrogen Diffusion on Gas Carbonitriding" Heat Treatment, 1985, Vol. 25, No. 5, pp. 242-247

Patent Document 1: Japanese Patent Laying-Open No. 8-013125

DISCLOSURE OF THE INVENTION

Problems to be Solved by the Invention

However, conventional carbonitriding process methods including the aforementioned carbonitriding method based on the undecomposed ammonia concentration as a parameter are disadvantageous in that the permeating rate of nitrogen into the workpiece (the amount of nitrogen permeating into the surface of the workpiece per unit area per unit time) cannot be readily controlled. The carbonitriding process is one step that is relatively high in cost in the fabrication steps of a machinery component. Therefore, there is a demand for reducing the cost of the carbonitriding process. This demand can be met if the permeating rate of nitrogen can be increased to improve the efficiency of the carbonitriding process by controlling the permeating rate of nitrogen to the workpiece.

In view of the foregoing, an object of the present invention is to provide a carbonitriding method that allows the permeating rate of nitrogen to be increased to improve the efficiency of the carbonitriding process. Another object of the present invention is to provide a fabrication method of a machinery component that allows the fabrication cost to be reduced by implementing an effective carbonitriding process. A further object of the present invention is to provide a machinery component with reduced fabrication cost by implementing an effective carbonitriding process.

Means for Solving the Problems

According to an aspect of the present invention, a carbonitriding method is directed to carbonitriding a workpiece formed of steel that contains at least 0.8 mass % of carbon by heating in an atmosphere including ammonia, carbon monoxide, carbon dioxide, and hydrogen. The carbonitriding method includes an atmosphere control step of controlling the atmosphere in a heat treatment furnace, and a heating pattern control step of controlling a temperature history applied to a workpiece in the heat treatment furnace.

The atmosphere control step includes an undecomposed $NH_3$ partial pressure control step of controlling the undecomposed ammonia partial pressure in the heat treatment furnace, and a $CO/CO_2$ partial pressure control step of controlling the partial pressure of at least one of the carbon monoxide and carbon dioxide in the heat treatment furnace. The undecomposed $NH_3$ partial pressure control step and the $CO/CO_2$ partial pressure control step are carried out in the atmosphere control step such that $a_c^*$ defined by the following equation (1) is at least 0.88 and not more than 1.27, and $\alpha$ defined by equation (2) is at least 0.012 and not more than 0.020, where $P_N$ is the undecomposed ammonia partial pressure and $P_H$ is the hydrogen partial pressure in the heat treatment furnace. As used herein, the unit of the partial pressure of each gas is atm (atmospheric pressure). Further, $a_c^*$ is relevant to the carbon activity when taking a value of not more than 1.0.

$$a_c^* = \frac{(P_{CO})^2}{K \times P_{CO_2}} \quad (1)$$

$P_{CO}$: partial pressure of carbon monoxide (atm), $P_{CO_2}$ partial pressure of carbon dioxide (atm)
K: equilibrium constant at $<C>+CO_2 \Leftrightarrow 2CO$ $$\alpha = \frac{P_N}{0.006 \times (P_H)^{\frac{3}{2}}} \times \frac{(1.877 - 1.055 \times a_c^*)}{100} \quad (2)$$

The inventor studied in detail the relationship between the atmosphere in the heat treatment furnace and the nitrogen concentration inside the workpiece when carbonitriding is carried out. The inventor found that the nitrogen permeating rate q into a workpiece is represented by the following equation (3).

$$q=\beta(\alpha-N_s) \quad (3)$$

q: nitrogen permeating rate, $\beta$: nitrogen transition coefficient; $\beta=1.7 \times 10^{-7}$, $N_S$: nitrogen concentration at workpiece surface.

Namely, increasing the value of a in equation (3) (refer to equations (1) and (2) set forth above) is effective in improving the nitrogen permeating rate into a workpiece to carry out an effective carbonitriding process.

The nitrogen concentration at the outermost surface layer of the workpiece, for example at the region of 5 μm in depth from the surface, has a threshold limit depending upon $a_c^*$. Even if the nitrogen permeating rate is raised by increasing a, the nitrogen concentration at the outermost surface layer, upon reaching the threshold limit, cannot become any higher. Accordingly, the nitrogen permeating amount (the amount of nitrogen permeating into the surface of the workpiece per unit area) cannot be increased any higher. As a result, increase of the nitrogen concentration in the workpiece will be basically rate-determined by the nitrogen diffusion according to the diffusion coefficient in the workpiece. The effect of the atmosphere in the heat treatment furnace on the nitrogen concentration in the workpiece, i.e. the influence of a, will become smaller. In other words, although the efficiency of the carbonitriding process will basically be improved by increasing the value of $\alpha$, there is a critical value at which the effect of cc on the improvement in the efficiency of the carbonitriding process is saturated due to the presence of the aforementioned threshold limit.

The inventor carried on further study, and identified that, when the $\alpha$ value is equal to or below 0.012, the nitrogen permeating amount into the workpiece within a predetermined time increases at substantially a constant ratio as the value of $\alpha$ becomes larger, and when the $\alpha$ value exceeds 0.012, the increasing ratio of the nitrogen permeating amount is reduced. Therefore, by setting the $\alpha$ value to at least 0.012, nitrogen can be introduced effectively into a workpiece in carbonitriding.

When the $\alpha$ value exceeds 0.020, a problem in addition to the saturation of the nitrogen permeating amount within a predetermined time occurs. Specifically, when the $\alpha$ value is set larger than 0.020, sooting (the phenomenon of soot being generated in the heat treatment furnace and adhering to the workpiece) will readily occur, leading to the possibility of inconvenience as to the quality such as surface carburizing of the workpiece. Thus, the $\alpha$ value is preferably set to not more than 0.020. In order to avoid the problem set forth above more reliably, the a value is preferably set to not more than 0.018.

Moreover, the value of $a_c^*$ has a one-to-one correspondence with the carbon potential $(C_P)$ at $a_c^* \leq 1$. In order to prevent decarburizing at the surface layer of the workpiece due to reduction in the $C_P$ value in the carbonitriding process of a workpiece formed of steel that contains at least 0.8 mass % of carbon, the value of $a_c^*$ is preferably set to at least 0.88. If the value of $a_c^*$ exceeds 1.27, excessive carbides (cementite; $Fe_3C$) will be formed at the surface layer of the workpiece, leading to the possibility of adversely affecting the property of the workpiece. Therefore, the value of $a_c^*$ is preferably set to not more than 1.27. Furthermore, there is a possibility of sooting if the value of $a_c^*$ is larger than 1.00. Therefore, the value of $a_c^*$ is preferably set to not more than 1.00.

Since carbonitriding is carried out by heating a workpiece in an atmosphere such that the value of $a_c^*$ is at least 0.88 and not more than 1.27, and the value of $\alpha$ is at least 0.012 and not more than 0.020 according to the carbonitriding method of the present invention, the carbon concentration at the surface layer of the workpiece can be maintained appropriately. In addition, the nitrogen permeating rate can be improved to allow an effective carbonitriding process.

Undecomposed ammonia refers to the ammonia remaining in the gaseous ammonia state without being decomposed, among the ammonia supplied into the heat treatment furnace.

Preferably in the carbonitriding method set forth above, the undecomposed ammonia partial pressure in the heat treatment furnace is measured, and this undecomposed ammonia partial pressure is compared with the target undecomposed ammonia partial pressure for the value of $\alpha$ to be in the range of at least 0.012 and not more than 0.020 in order to adjust the flow rate of ammonia supplied into the heat treatment furnace per unit time, in the undecomposed $NH_3$ partial pressure control step.

Accordingly, the undecomposed ammonia partial pressure in the atmosphere of the heat treatment furnace can be controlled with favorable accuracy. As a result, control of the $\alpha$ value in the heat treatment furnace during the aforementioned atmosphere control step is facilitated. The comparison between the aforementioned undecomposed ammonia partial pressure and target undecomposed ammonia partial pressure can be made, not only by actually comparing the partial pressures, but also by comparing values equivalent to the partial pressure such as the concentration of the undecomposed ammonia.

Preferably in the carbonitriding method, the atmosphere control step further includes an $H_2$ partial pressure control step of controlling the hydrogen partial pressure in the heat treatment furnace. In the $H_2$ partial pressure control step, the flow rate of hydrogen supplied into the heat treatment furnace per unit time is adjusted.

In order to set the value of $\alpha$ to a desired value, the supplied amount (flow rate) of ammonia into the heat treatment furnace per unit time can be adjusted to control the undecomposed ammonia partial pressure, as shown in equation (2).

Alternatively, the flow rate of hydrogen may be adjusted to control the hydrogen partial pressure. There may be a case where it is difficult to control the undecomposed ammonia partial pressure by adjusting the flow rate of ammonia, depending upon the combination of the shape and/or mass of the workpiece and the property of the heat treatment furnace. In this case, it is particularly preferable to control the hydrogen partial pressure by adjusting the flow rate of hydrogen in the $H_2$ partial pressure control step to set the α value to a desired value.

Preferably in the $H_2$ partial pressure control step of the carbonitriding method, the hydrogen partial pressure in the heat treatment furnace is measured, and this hydrogen partial pressure is compared with a target hydrogen partial pressure for the α value to be in the range of at least 0.012 and not more than 0.020 in order to adjust the flow rate of hydrogen supplied to the heat treatment furnace per unit time.

Accordingly, the hydrogen partial pressure in the atmosphere of the heat treatment furnace can be controlled with favorable accuracy. As a result, control of the α value in the heat treatment furnace during the atmosphere control step is facilitated. The comparison between the hydrogen partial pressure and target hydrogen partial pressure can be made, not only by actually comparing the partial pressures, but also by comparing values equivalent to the partial pressure such as the concentration of hydrogen.

Preferably in the carbonitriding method, the heating pattern control step is carried out with the carbonitriding time determined based on the relationship of the carbonitriding time that is the time during which the workpiece is maintained at the temperature of at least $A_1$ point and the value of nitrogen permeating rate q defined by equation (3) set forth above to the nitrogen concentration at a region of a predetermined depth from the surface of the workpiece, determined for each composition of steel constituting the workpiece.

The permeating rate of nitrogen into a workpiece during a carbonitriding process is a complex variable depending upon various parameters. It is therefore generally difficult to control the distribution of the nitrogen concentration in the workpiece. When the workpiece is subjected to a carbonitriding process, and then has the region in proximity to the surface removed by a finishing process or the like, the nitrogen content at the region of a predetermined depth, not at the region in proximity to the surface, will be crucial.

According to the carbonitriding method of the present invention, the nitrogen permeating rate q to the workpiece has become definite by equation (3). Therefore, by obtaining in advance the relationship of the carbonitriding time and the value of q to the nitrogen concentration at a region of a predetermined depth from the surface of the workpiece, determined depending upon the composition of the steel constituting the workpiece, the carbonitriding time can be determined based on the obtained relationship, allowing control of the nitrogen content at the region of a desired depth of the workpiece.

A fabrication method of a machinery component according to the present invention includes a steel member preparation step of preparing a steel member formed of steel that contains at least 0.8 mass % of carbon and shaped roughly into a configuration of a machinery component, and a quench-hardening step of quench-hardening the steel member by cooling from the temperature of at least $A_1$ point to a temperature of not more than $M_S$ point, after the steel member prepared in the steel member preparation step is subjected to a carbonitriding process. The carbonitriding process in the quench-hardening step is carried out using the carbonitriding method of the present invention set forth above.

According to the fabrication method of a machinery component of the present invention, an effective carbonitriding process is carried out to allow reduction in the fabrication cost of the machinery component by using the above-described carbonitriding method of the present invention suitable for a workpiece formed of steel that contains at least 0.8 mass % of carbon, in the quench-hardening step.

As used herein, $A_1$ point refers to the temperature point where the steel structure transforms from ferrite into austenite when steel is heated. $M_S$ point refers to the temperature point where martensite is initiated during cooling of the austenitized steel.

A machinery component according to an aspect of the present invention is fabricated by the above-described machinery component fabrication method. By fabricating a machinery component by the machinery component fabrication method of the present invention set forth above, the machinery component of the present invention is subjected to an effective carbonitriding process to have the fabrication cost reduced.

The machinery component of the present invention may be employed as a component that constitutes a bearing. A machinery component according to the present invention having the surface layer increased in strength by being subjected to carbonitriding and reduced in fabrication cost is suitable for use as a component constituting a bearing that is a machinery component where fatigue strength, wear resistance, and the like are required.

Using a machinery component set forth above, a rolling bearing including a bearing ring and a rolling element in contact with the bearing ring, disposed on a circular ring raceway, may be formed. Namely, at least one of, or preferably both the bearing ring and rolling element are machinery components set forth above. By such a machinery component according to the present invention, having the surface layer increased in strength by being subjected to carbonitriding and reduced in fabrication cost, a rolling bearing of long lifetime, reduced in fabrication cost, can be provided.

Effects of the Invention

As apparent from the description set forth above, the present invention provides a carbonitriding method that improves the nitrogen permeating rate to render the carbonitriding process effective. Furthermore, by carrying out an effective carbonitriding process according to a machinery component fabrication method of the present invention, there can be provided a fabrication method of a machinery component, allowing the fabrication cost to be reduced. Moreover, by carrying out an effective carbonitriding process, a machinery component of the present invention, reduced in fabrication cost, can be provided.

Figure 1:
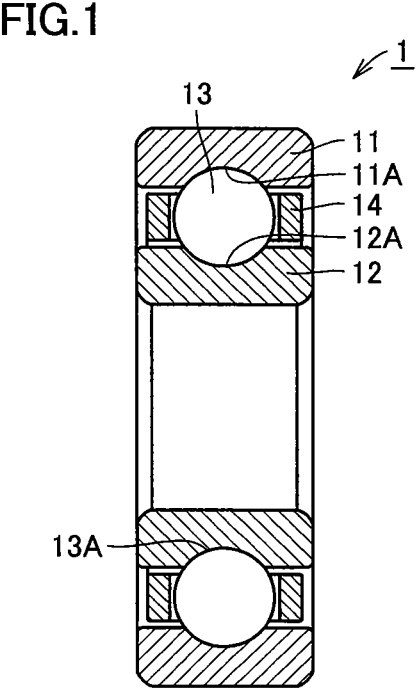
FIG. 1 is a schematic sectional view of a configuration of a deep groove ball bearing qualified as a rolling bearing including a machinery component according to an embodiment of the present invention.

DESCRIPTION OF THE REFERENCE CHARACTERS 1 deep groove ball bearing; 2 thrust needle roller bearing; 3 constant velocity joint; 11 outer ring; 11A outer ring raceway; 12 inner ring; 12A inner ring raceway; 13 ball; 14, 24 cage; 21 bearing ring; 21A bearing ring raceway; 23 needle roller; 31 inner race; 31A inner race ball groove; 32 outer race; 32A outer race ball groove; 33 ball; 34 cage; 35, 36 shaft; 50 atmosphere control step; 51 undecomposed $NH_3$ partial pressure control step; 52 $H_2$ partial pressure control step; 53 $CO/CO_2$ partial pressure control step; 60 heating pattern control step.

BEST MODES FOR CARRYING OUT THE INVENTION

Embodiments of the present invention will be described hereinafter based on the drawings. In the drawings, the same or corresponding elements have the same reference characters allotted, and description thereof will not be repeated.

First, a deep groove ball bearing qualified as a rolling bearing according to an embodiment of the present invention will be described hereinafter with reference to FIG. 1.

Referring to FIG. 1, a deep groove ball bearing 1 includes an annular outer ring 11, an annular inner ring 12 arranged at the inner side of outer ring 11, and a plurality of balls 13 serving as rolling elements arranged between outer and inner rings 11 and 12, held in a cage 14 of a circular ring configuration. An outer ring raceway 11A is formed at the inner circumferential face of outer ring 11. An inner ring raceway 12A is formed at the outer circumferential face of inner ring 12. Outer ring 11 and inner ring 12 are disposed such that inner ring raceway 12A and outer ring raceway 11A face each other. The plurality of balls 13 are held in a rollable manner on the circular raceway, in contact with inner ring raceway 12A and outer ring raceway 11A, disposed at a predetermined pitch in the circumferential direction by means of cage 14. By such a configuration, outer ring 11 and inner ring 12 of deep groove ball bearing 1 can be rotated relative to each other.

Among outer ring 11, inner ring 12, ball 13 and cage 14 that are machinery components, particularly outer ring 11, inner ring 12 and ball 13 require rolling fatigue strength and wear resistance. By employing at least one thereof as a machinery component of the present invention, the lifetime of deep groove ball bearing 1 can be increased while reducing the fabrication cost thereof.

A thrust needle roller bearing qualified as a rolling bearing according to an embodiment of the present invention will be described hereinafter with reference to FIG. 2.

Figure 2:
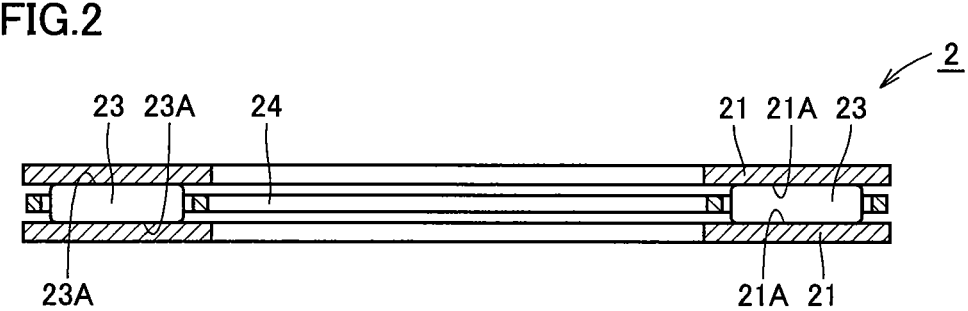
FIG. 2 is a schematic sectional view of a configuration of a thrust needle roller bearing qualified as a rolling bearing including a machinery component according to an embodiment of the present invention.

Referring to FIG. 2, a thrust needle roller bearing 2 includes a pair of bearing rings 21 taking a disk shape, serving as a rolling member arranged such that one main surface faces each other, a plurality of needle rollers 23 serving as a rolling member, and a cage 24 of a circular ring configuration. The plurality of needle rollers 23 are held in a rollable manner on the circular raceway, in contact with bearing ring raceway 21A formed at the main surfaces of the pair of bearing rings 21 facing each other, disposed at a predetermined pitch in the circumferential direction by means of cage 24. By such a configuration, the pair of bearing rings 21 of thrust needle roller bearing 2 can be rotated relative to each other.

Among bearing ring 21, needle roller 23, and cage 24 that are machinery components, particularly bearing ring 21 and needle roller 23 require rolling fatigue strength and wear resistance. By employing at least one thereof as a machinery component according to the present invention, the lifetime of thrust needle roller bearing 2 can be increased while reducing the fabrication cost thereof.

Figure 3:
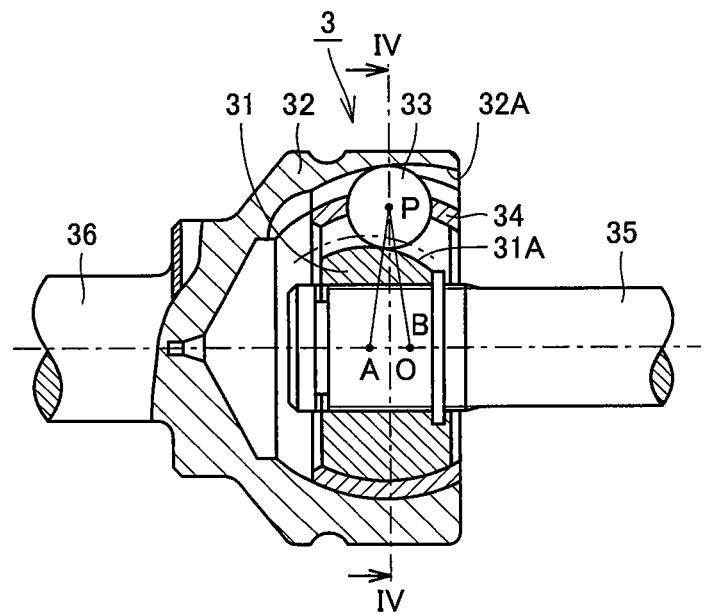
FIG. 3 is a schematic partial sectional view of a configuration of a constant velocity joint including a machinery component according to an embodiment of the present invention.

A constant velocity joint according to an embodiment of the present invention will be described hereinafter with reference to FIGS. 3-5. FIG. 3 is a schematic sectional view taken along line III-III of FIG. 4.

Figure 4:
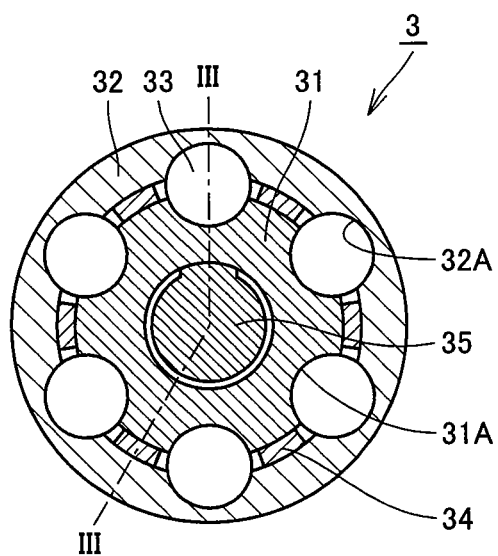
FIG. 4 is a schematic sectional view taken along line IV-IV of FIG. 3.
Figure 5:
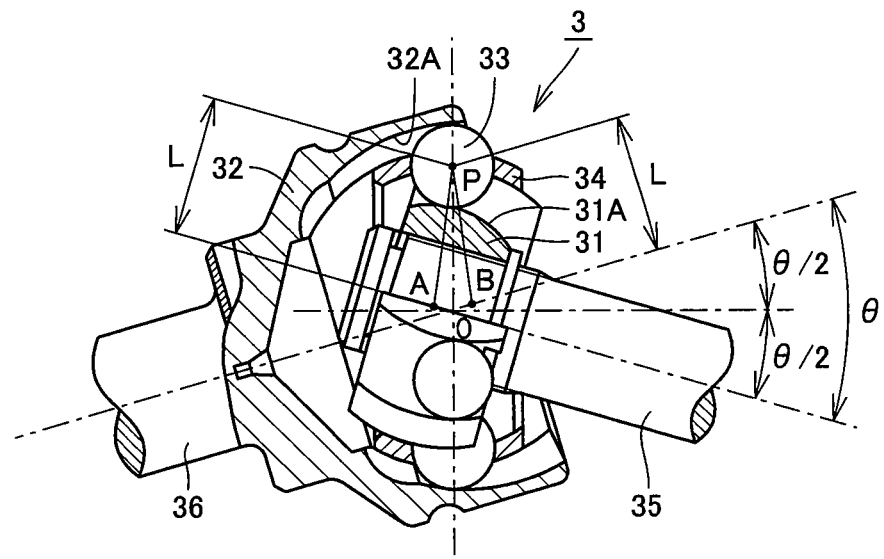
FIG. 5 is a schematic partial sectional view of the constant velocity joint of FIG. 3 in an angled state.

Referring to FIGS. 3-5, a constant velocity joint 3 includes an inner race 31 coupled to a shaft 35, an outer race 32 arranged to surround the outer circumferential side of inner race 31 and coupled to shaft 36, a ball 33 for torque transmission, arranged between inner race 31 and outer race 32, and a cage 34 for holding ball 33. Ball 33 is arranged in contact with an inner race ball groove 31A formed at the outer circumferential face of inner race 31 and an outer race ball groove 32A formed at the inner circumferential face of outer race 32, and held by cage 34 to avoid falling off.

As shown in FIG. 3, inner race ball groove 31A and outer race ball groove 32A located at the outer circumferential face of inner race 31 and the inner circumferential face of outer race 32, respectively, are formed in a curve (arc) with points A and B equally spaced apart at the left and right on the axis passing through the center of shafts 35 and 36 in a straight line from the joint center O on the axis as the center of curvature. In other words, inner race ball groove 31A and outer race ball groove 32A are formed such that the trajectory of center P of ball 33 that rolls in contact with inner race ball groove 31A and outer race ball groove 32A corresponds to a curve (arc) with point A (inner race center A) and point B (outer race center B) as the center of curvature. Accordingly, ball 33 is constantly located on the bisector of an angle (∠AOB) with respect to the axis passing through the center of shafts 35 and 36 even when the constant velocity joint is operated at an angle (when the constant velocity joint moves such that the axes passing through the center of shafts 35 and 36 cross).

The operation of constant velocity joint 3 will be described hereinafter. Referring to FIGS. 3 and 4, when the rotation about the axis is transmitted to one of shafts 35 and 36 at constant velocity joint 3, this rotation is transmitted to the other of shafts 35 and 36 via ball 33 placed in inner race ball groove 31A and outer race ball groove 32A. In the case where shafts 35 and 36 constitute an angle of θ as shown in FIG. 5, ball 33 is guided by inner race ball groove 31A and outer race ball groove 32A with inner race center A and outer race center B as the center of curvature to be held at a position where its center P is located on the bisector of ∠AOB. Since inner race ball groove 31A and outer race ball groove 32A are formed such that the distance from joint center O to inner race center A is equal to the distance from joint center O to outer race center B, the distance from center P of ball 33 to respective inner race center A and outer race center B is equal. Thus, triangle OAP is congruent to triangle OBP. As a result, the distance L from center P of ball 33 to shafts 35 and 36 are equal to each other. When one of shafts 35 and 36 rotates about the axis, the other also rotates at constant velocity. Thus, constant velocity joint 3 can ensure constant velocity even in the state where shafts 35 and 36 constitute an angle. Cage 34 serves, together with inner race ball groove 31A and outer race ball groove 32A, to prevent ball 33 from jumping out of inner race ball groove 31A and outer race ball groove 32A when shafts 35 and 36 rotate, and also to determine joint center O of constant velocity joint 3.

Among inner race 31, outer race 32, ball 33 and cage 34 that are machinery components, particularly inner race 31, outer race 32 and ball 33 require fatigue strength and wear resistance. By taking at least one thereof as the machinery component of the present invention, the lifetime of constant velocity joint 3 can be increased with the fabrication cost reduced.

A machinery component according to an embodiment corresponding to one embodiment in the fabrication method of a machinery component of the present invention, and a fabrication method of a machinery element such as a rolling bearing and constant velocity joint including the machinery component will be described hereinafter.

Figure 6:
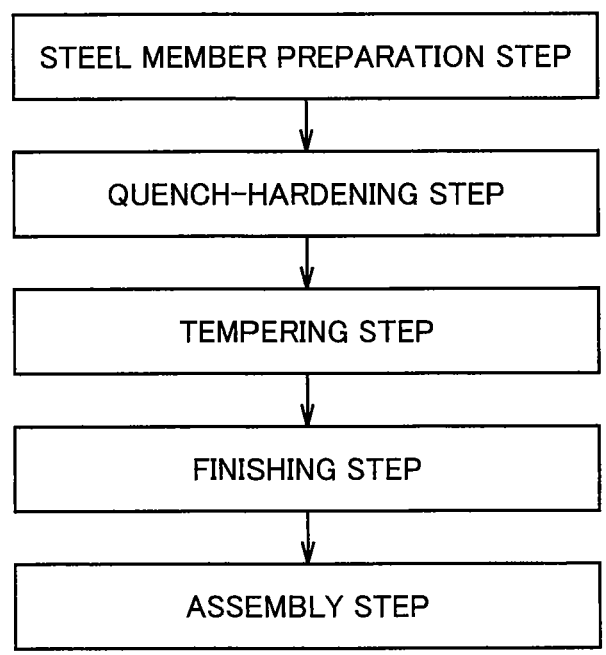
FIG. 6 schematically represents a fabrication method of a machinery component according to an embodiment of the present invention and a machinery element including such machinery component.

Referring to FIG. 6, first a steel member preparation step of preparing a steel member formed of steel that contains at least 0.8 mass % of carbon, shaped roughly in a configuration of a machinery component, is carried out. Specifically, a steel bar, steel wire, or the like containing at least 0.8 mass % of carbon, for example, is used as the material. This steel bar, steel wire, or the like is subjected to processing such as cutting, forging, turning and the like to be prepared as a steel member shaped roughly into the configuration of a machinery component such as outer ring 11, bearing ring 21, inner race 31, or the like.

The steel member prepared at the steel member preparation step is subjected to a carbonitriding process, and then cooled down from the temperature of at least $A_1$ point to a temperature of not more than $M_S$ point. This corresponds to the quenching-hardening step of quench-hardening the steel member. Details of the quench-hardening step will be described afterwards.

Then, the steel member subjected to the quench-hardening step is heated to a temperature of not more than $A_1$ point. This tempering step is carried out to improve the toughness and the like of the steel member. Specifically, the quench-hardened steel member is heated to a temperature of at least 150° C. and not more than 350° C., for example 180° C., that is a temperature lower than $A_1$ point, and maintained for a period of time of at least 30 minutes and not more than 240 minutes, for example 120 minutes, followed by being cooled in the air of room temperature (air cooling).

Further, a finishing step such as machining is applied on the steel member subjected to the tempering step. Specifically, a grinding process is applied on inner ring raceway 12A, bearing ring raceway 21A, outer race ball groove 32A and the like of the steel member subjected to the tempering step. Thus, a machinery component according to an embodiment of the present invention is completed, and the fabrication method of a machinery component according to an embodiment of the present invention ends.

In addition, an assembly step of fitting the completed machinery component to build a machinery element is implemented. Specifically, outer ring 11, inner ring 12, ball 13 and cage 14, for example, that are machinery components of the present invention fabricated by the steps set forth above, are fitted together to build a deep groove ball bearing 1. Thus, a machinery element including a machinery component of the present invention is fabricated.

Figure 9:
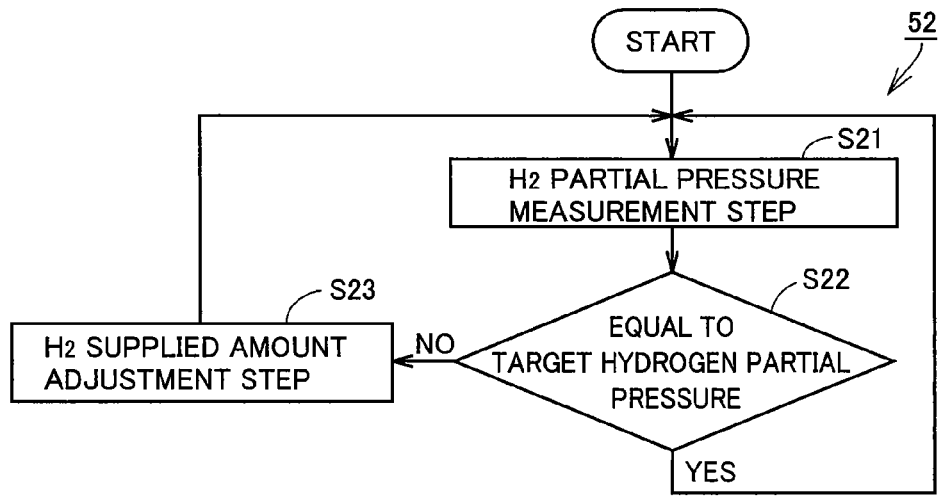
FIG. 9 is a diagram to describe an $H_2$ partial pressure control step included in the atmosphere control step of FIG. 7.
Figure 10:
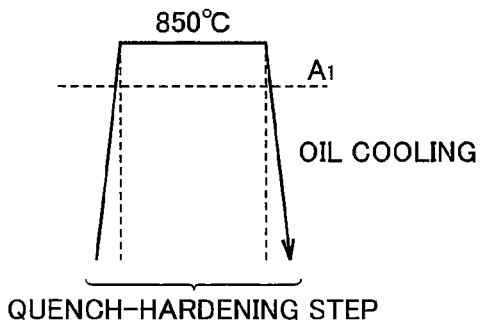
FIG. 10 represents an example of a heating pattern (temperature history applied to workpiece) in a heating pattern control step included in the carbonitriding step of FIG. 7.

The details of the aforementioned quench-hardening step will be described hereinafter. In FIG. 10, the horizontal direction corresponds to time with the elapse in the rightward direction, whereas the vertical direction corresponds to temperature, representing a higher temperature as a function of height. With reference to FIGS. 7-10, a quench-hardening step included in the machinery component fabrication method of the present embodiment will be described in detail.

Figure 7:
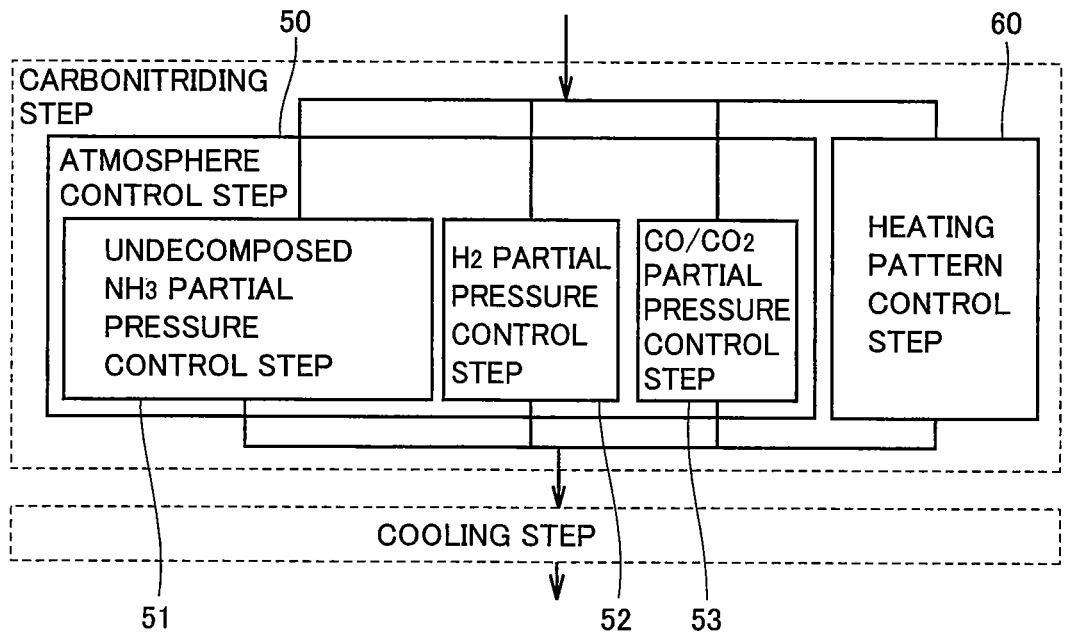
FIG. 7 is a diagram to describe in detail a quench-hardening step in the fabrication method of a machinery component according to an embodiment of the present invention.

Referring to FIG. 7, in a quench-hardening step of the fabrication method of a machinery component according to an embodiment of the present invention, a carbonitriding step of carbonitriding a steel member identified as a workpiece is first carried out. Then, a cooling step of cooling the steel member down from the temperature of at least $A_1$ point to the temperature of not more than $M_S$ point is carried out. In the carbonitriding step, a carbonitriding process is carried out by using the carbonitriding method of the present invention in which carbonitriding is effected by heating a workpiece formed of steel that contains at least 0.8 mass % of carbon in a carbonitriding atmosphere that includes ammonia, carbon monoxide, carbon dioxide and hydrogen.

The carbonitriding step includes an atmosphere control step 50 of controlling the atmosphere in the heat treatment furnace, and a heating pattern control step 60 of controlling the temperature history applied to the workpiece in the heat treatment furnace. These atmosphere control step 50 and heating pattern control step 60 can be carried out concurrently, independent of each other. Atmosphere control step 50 includes an undecomposed $NH_3$ partial pressure control step 51 of controlling the partial pressure of undecomposed ammonia in the heat treatment furnace, an $H_2$ partial pressure control step 52 of controlling the partial pressure of hydrogen in the heat treatment furnace, and a $CO/CO_2$ partial pressure control step 53 of controlling the partial pressure of at least one of carbon monoxide and carbon dioxide in the heat treatment furnace.

In $CO/CO_2$ partial pressure control step 53, $a_c^*$ is controlled by adjusting the partial pressure of at least one of the carbon monoxide and carbon dioxide in the heat treatment furnace, referring to equation (1).

Undecomposed $NH_3$ partial pressure control step 51, $H_2$ partial pressure control step 52, and $CO/CO_2$ partial pressure control step 53 are carried out in atmosphere control step 50 such that $a_c^*$ defined by equation (1) is at least 0.88 and not more than 1.27, and α in equation (2) is in the range of at least 0.012 and not more than 0.020.

Figure 8:
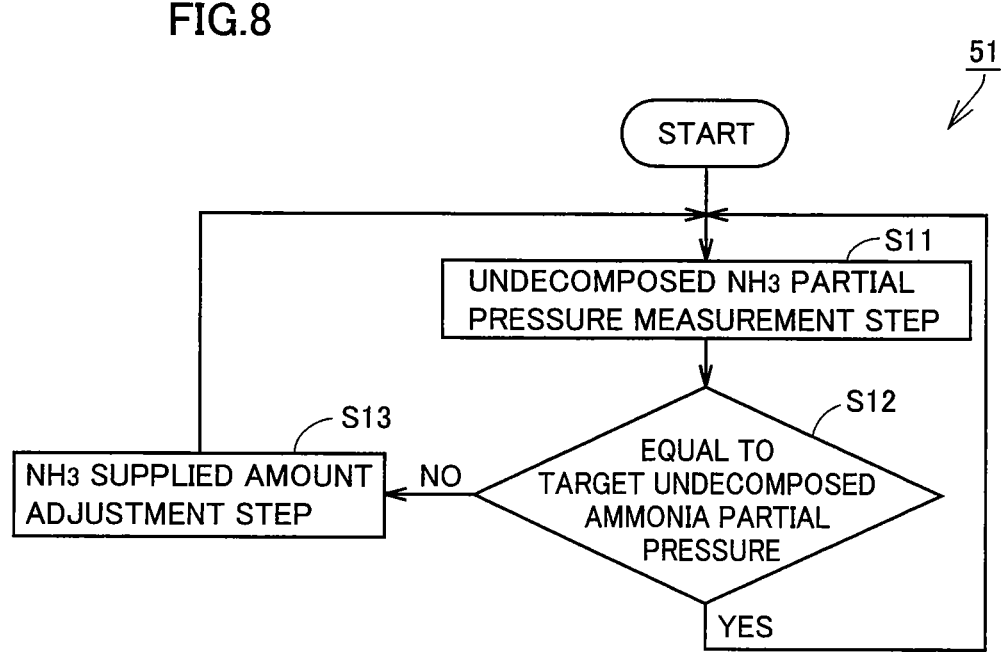
FIG. 8 is a diagram to describe an undecomposed $NH_3$ partial pressure control step included in the atmosphere control step of FIG. 7.

Specifically, referring to FIG. 8, an undecomposed $NH_3$ partial pressure measurement step (S11) of measuring the undecomposed ammonia partial pressure in the heat treatment furnace is carried out at undecomposed $NH_3$ partial pressure control step 51. The undecomposed ammonia partial pressure can be measured using, for example, a gas chromatograph. Then, undecomposed $NH_3$ partial pressure determination step (S12) of determining whether an $NH_3$ supplied amount adjustment step (S13) of increasing or decreasing the supplied amount of ammonia gas to the heat treatment furnace is to be executed or not is carried out based on the undecomposed ammonia partial pressure that is measured at step S11. This determination is made by comparing the target undecomposed ammonia partial pressure that has been determined such that α is within the range of at least 0.012 and not more than 0.020 with the measured undecomposed ammonia partial pressure, and identifying whether the measured undecomposed ammonia partial pressure is equivalent to the target undecomposed ammonia partial pressure.

In the case where the undecomposed ammonia partial pressure is not equal to the target undecomposed ammonia partial pressure, a step (S13) to increase or decrease the undecomposed ammonia partial pressure in the heat treatment furnace is carried out, followed by step S11 again. Step S13 can be carried out by adjusting the amount of ammonia flowing into the heat treatment furnace per unit time (flow rate of ammonia gas) from an ammonia gas cylinder coupled to the heat treatment furnace via a pipe using a flow rate control device including a mass flow controller or the like attached to the pipe. Specifically, when the measured undecomposed ammonia partial pressure is higher than the target undecomposed ammonia partial pressure, the flow rate is reduced. When the measured undecomposed ammonia partial pressure is lower than the target undecomposed ammonia partial pressure, the flow rate is increased. Thus, step S13 can be carried out. When there is a predetermined difference between the measured undecomposed ammonia partial pressure and the target undecomposed ammonia partial pressure at step S13, the degree of how much the flow rate is to be increased/decreased can be determined based on the relationship between the increase/decrease of the flow rate of ammonia gas and the increase/decrease of undecomposed ammonia partial pressure, determined empirically in advance.

In the case where the undecomposed ammonia partial pressure is equal to the target undecomposed ammonia partial pressure, step S11 is carried out again without execution of step S13.

$H_2$ partial pressure control step 52 is carried out similarly to undecomposed $NH_3$ partial pressure control step 51 set forth above. Referring to FIG. 9 corresponding to $H_2$ partial pressure control step 52, an $H_2$ partial pressure measurement step (S21) of measuring the hydrogen partial pressure in the heat treatment furnace is first carried out. Measurement of the hydrogen partial pressure can be effected using, for example, a thermal conductivity gas analyzer. Based on the hydrogen partial pressure measured at step S21, determination is made as to whether execution of an $H_2$ supplied amount adjustment step (S23) of increasing/decreasing the supplied amount of hydrogen gas to the heat treatment furnace is required or not. This hydrogen partial pressure determination step (S22) is carried out by comparing the target hydrogen partial pressure that has been determined such that a is within the range of at least 0.012 and not more than 0.020 with the measured hydrogen partial pressure, and identifying whether the measured hydrogen partial pressure is equivalent to the target hydrogen partial pressure.

When the hydrogen partial pressure is not equal to the target hydrogen partial pressure, a step (S23) to increase/decrease the hydrogen partial pressure in the heat treatment furnace is carried out, followed by execution of step S21 again. Step S23 can be carried out by adjusting the amount of hydrogen flowing into the heat treatment furnace per unit time (flow rate of hydrogen gas) from a hydrogen gas cylinder coupled to the heat treatment furnace via a pipe using a flow rate control device including a mass flow controller or the like attached to the pipe. Specifically, when the measured hydrogen partial pressure is higher than the target hydrogen partial pressure, the flow rate is reduced; when the measured hydrogen partial pressure is lower than the target hydrogen partial pressure, the flow rate is increased. Thus, step S23 can be executed. When there is a predetermined difference between the measured hydrogen partial pressure and the target hydrogen partial pressure in step S23, the degree of how much the flow rate is to be increased/decreased can be determined, similar to the case of ammonia, based on the relationship between the increase/decrease of the flow rate of hydrogen gas and the increase/decrease of the hydrogen partial pressure, determined empirically in advance.

When the hydrogen partial pressure is equal to the target hydrogen partial pressure, step S21 is carried out again without execution of step S23.

Referring to FIG. 7, in $CO/CO_2$ partial pressure control step 53, $a_c^*$ is adjusted by regulating the supplied amount of propane ($C_3H_8$) gas, butane gas ($C_4H_{10}$) and the like, identified as enriched gas, to control the partial pressure of at least one of CO and $CO_2$. Specifically, carbon monoxide partial pressure $P_{CO}$ and carbon dioxide partial pressure $P_{CO2}$ in the atmosphere are measured using, for example, an infrared gas concentration measurement apparatus. The supplied amount of propane ($C_3H_8$) gas, butane gas ($C_4H_{10}$) and the like, identified as enriched gas, is adjusted such that $a_c^*$ defined by equation (1) takes a target value in the range of at least 0.88 and not more than 1.27.

The value of α can be controlled by altering at least one of the undecomposed ammonia partial pressure, hydrogen partial pressure, and $a_c^*$ at undecomposed $NH_3$ partial pressure control step 51, $H_2$ partial pressure control step 52 and $CO/CO_2$ partial pressure control step 53, referring to equation (2). Namely, the α value can be controlled, for example, by altering the hydrogen partial pressure at $H_2$ partial pressure control step 52 with the undecomposed ammonia concentration and $a_c^*$ maintained constant by undecomposed $NH_3$ partial pressure control step 51 and $CO/CO_2$ partial pressure control step 53. Alternatively, the a value may be controlled by altering the undecomposed ammonia partial pressure at undecomposed $NH_3$ partial pressure control step 51 with the hydrogen partial pressure and $a_c^*$ value maintained constant by $H_2$ partial pressure control step 52 and $CO/CO_2$ partial pressure control step 53.

Referring to FIG. 7, the heating history applied to the steel member identified as a workpiece is controlled at heating pattern control step 60. Specifically, as shown in FIG. 10, the steel member is heated to a temperature of at least 800° C. and not more than 1000° C., that is a temperature of at least $A_1$ point, for example to 850° C., and maintained for a period of at least 60 minutes and not more than 300 minutes, for example 150 minutes, in an atmosphere controlled by atmosphere control step 50 set forth above. At the elapse of the maintaining period, the heating pattern control step ends. The atmosphere control step also ends at the same time.

Then, referring to FIG. 7, the steel member is immersed in oil (oil cooling) to be cooled from a temperature of at least $A_1$ point down to a temperature of not more than $M_S$ point. This corresponds to the cooling step. By the steps set forth above, the steel member has the surface layer subjected to carbonitriding as well as quench-hardening. Thus, the quench-hardening step of the present embodiment is completed.

According to the carbonitriding method of the present embodiment having carbonitriding effected by heating a workpiece formed of steel that contains at least 0.8 mass % of carbon in an atmosphere where the values of $a_c^*$ and α are controlled in an appropriate range, a favorable carbonitriding process can be carried out while improving the permeating rate of nitrogen to a workpiece. As a result, the carbonitriding process can be rendered effective.

In addition, according to the carbonitriding method of the present embodiment, determination is made as to whether increase/decrease of the supplied amount of ammonia and hydrogen is required or not based on the measured values of the undecomposed ammonia partial pressure and the hydrogen partial pressure in the heat treatment furnace. Therefore, the undecomposed ammonia partial pressure and hydrogen partial pressure in the atmosphere of the heat treatment furnace can be controlled with favorable accuracy. As a result, control of the α value in the heat treatment furnace in the atmosphere control step is facilitated.

According to the fabrication method of a machinery component in the present embodiment, a machinery component subjected to a carbonitriding process can be fabricated with the fabrication cost reduced. The machinery component of the present embodiment is identified as a machinery component subjected to a carbonitriding process with the fabrication cost reduced.

In the carbonitriding method of the present embodiment, heating pattern control step 60 is preferably carried out with the carbonitriding time determined based on the relationship of the carbonitriding time and the value of nitrogen permeating rate q defined by equation (3) to the nitrogen concentration at a region of a predetermined depth from the surface of the workpiece, determined for each composition of steel constituting the workpiece.

Specifically, heating pattern control step 60 can be carried out with the carbonitriding time determined in view of the nitrogen supplied to the surface of the workpiece at the nitrogen permeating rate q of equation (3) being diffused and distributed according to the Gaussian error function, as indicated by equation (4) set forth below. The depth where the nitrogen concentration is to be controlled is determined taking into account the processing steps that is to be carried out after the workpiece has been carbonitrided, as well as the usage state thereafter, and the like. Then the carbonitriding time can be determined such that the nitrogen concentration at the depth where the nitrogen concentration is to be controlled attains the desired concentration, based on the aforementioned relationship.

$$N = N_s \times \left\{ 1 - \mathrm{erf}\left(\frac{x}{2\sqrt{Dt}}\right) \right\} \quad (4)$$

N: nitrogen concentration at a region where the depth from the surface is x; $N_S$: nitrogen concentration at the surface; x: depth from the surface; D: diffusion coefficient of nitrogen in the workpiece; t: carbonitriding time.

Diffusion coefficient D can be obtained empirically. As a diffusion coefficient taking into account the effect of the nitrogen concentration in the workpiece on the diffusion coefficient, diffusion coefficient D shown in equation (5) set forth below can be employed in the calculation of equation (4).

$$D = 6.85 \times 10^{-7} \exp(140 \times N) \quad (5)$$

N: nitrogen concentration

The aforementioned relationship of the carbonitriding time and nitrogen permeating rate q to the nitrogen concentration at the region of a predetermined depth from the surface of the workpiece is determined depending upon the composition of steel constituting the workpiece. Therefore, by determining this relationship in advance, the carbonitriding time can be defined based on the determined relationship for a workpiece of the same composition even if the shape of the workpiece is modified. Accordingly, the nitrogen content at the region of a desired depth that is crucial to the workpiece can be readily controlled.

Although a deep groove ball bearing, thrust needle roller bearing, and constant velocity joint are described in the present embodiment as an example of machinery components of the present invention, the machinery component of the present invention is not limited thereto, and may be another machinery component that requires fatigue strength and wear resistance at the surface layer such as a hub, gear, or shaft.

The surface layer of a workpiece refers to a region in proximity to the surface of the workpiece, and refers to a region not more than 0.2 mm in distance from the surface after the workpiece has been subjected to a finishing process and the like to be completed as a product. In other words, the surface layer of a workpiece is the region where the nitrogen concentration and carbon concentration should be controlled in the state where the workpiece is qualified as a completed product in consideration of the required property of the fabricated product of the workpiece subjected to processing, and can be determined appropriately for each product.

Example 1

Example 1 of the present invention will be described hereinafter. An experiment to study the relationship between the α value defined by equation (2) and the permeating amount of nitrogen into the workpiece was carried out. The procedure of the experiment is set forth below.

The capacity of the heat treatment furnace employed for the experiment was 120 L (liter). The workpiece was a JIS SUJ2 (1 mass % of carbon content) ring having an outer diameter of φ38 mm, an inner diameter of φ30 mm, and a width of 10 mm. This ring of 101 g (gram) was placed in the heat treatment furnace. A heating pattern similar to that of FIG. 10 was employed, and the retention temperature of carbonitriding was 850° C. The permeating amount of nitrogen into the workpiece was measured with the $a_c^*$, undecomposed ammonia amount, carbonitriding time, and composition of base gas (atmosphere gas other than enriched gas and ammonia gas) in the atmosphere varied. The amount of nitrogen permeating into the workpiece was measured by EPMA (Electron Probe Micro Analysis). The experiment conditions of Example 1 are shown in Table 1.

TABLE 1

| $a_c^*$ | Undecomposed ammonia amount (vol. %) | Carbonitriding time (sec.) | Base gas |
|---|---|---|---|
| 0.78~1.27 | 0.065~0.398 | 1800~18000 | RX gas or mixture gas of CO, $H_2$, $N_2$ CO: 10~40 vol. % $H_2$: 10~60 vol. % $N_2$: 0~80 vol. % |

Figure 11:
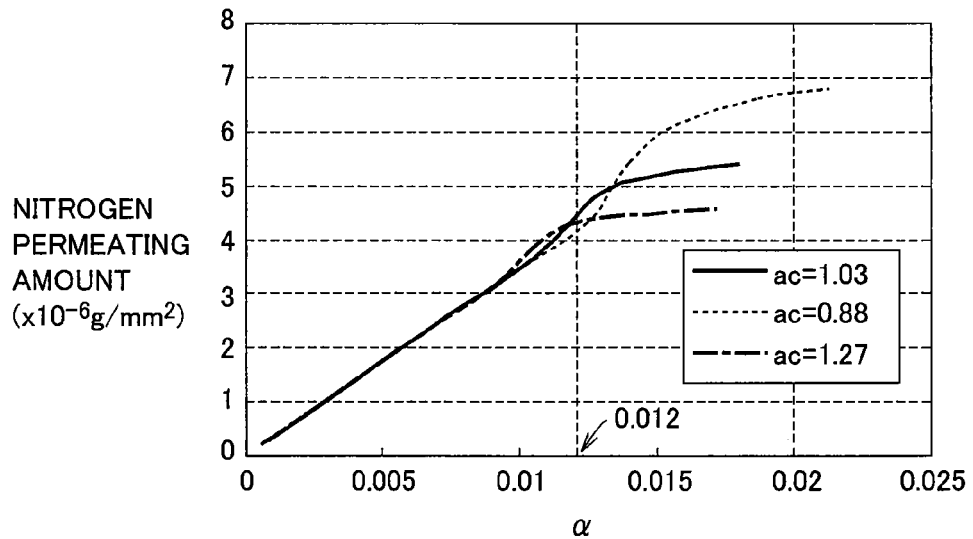
FIG. 11 represents the relationship between the a value and nitrogen permeating amount for the $a_c{}^*$ of three levels, based on a carbonitriding processing time of 4500 seconds.

The relationship of values $a_c^*$ and α to the nitrogen permeating amount will be described with reference to FIG. 11. In FIG. 11, the α value is plotted along the horizontal axis, and the nitrogen permeating amount is plotted along the vertical axis. The solid line, dotted line, and chain line with one dot correspond to the case where $a_c^*$ is 1.03, 0.88, and 1.27, respectively. In the present experiment, the elimination of carbide (cementite) was observed at the surface layer of the workpiece when the value of $a_c^*$ is lower than 0.88. It was confirmed that value of $a_c^*$ is insufficient (which in turn means that the $C_P$ value is insufficient). When the value of $a_c^*$ is 1.27, formation of excessive carbides was observed at the surface layer of the workpiece. It was confirmed that the value of $a_c^*$ is preferably not lower higher than 1.27. When the value of $a_c^*$ was 1.00, formation of excessive carbides at the surface layer of the workpiece was not observed. It was confirmed that the value of $a_c^*$ is particularly preferable to be set lower than 1.00.

Referring to FIG. 11, when α is lower than 0.012, the nitrogen permeating amount becomes larger at substantially a constant ratio as α becomes larger, irrespective of the value of $a_c^*$. However, in the range where α is 0.012 or greater, the ratio of increase of the nitrogen permeating amount with respect to the increase of α becomes smaller. When the value of a exceeds 0.015, the ratio of the increase of the nitrogen permeating amount becomes smaller, and hardly increases when α exceeds 0.020.

It was therefore appreciated that the value of α is preferably set to at least 0.012 in order to increase the nitrogen permeating amount to carry out carbonitriding effectively. However, since the nitrogen permeating amount hardly increases even if the value of α is set larger than 0.020, the value of α is preferably set to not more than 0.020 in order to avoid the generation of sooting by the increase in α, and preferably to not more than 0.018 in the case where avoiding sooting is given weight.

The results in FIG. 11 correspond to the case where the carbonitriding time is 4500 seconds. It was confirmed that there is a similar tendency in the range of 1800 seconds to 18000 seconds for the carbonitriding time shown in Table 1. In addition, the results of FIG. 11 correspond to the case where the carbonitriding temperature is 850° C. Additional experiments were carried out in the range of 830° C. to 870° C. for the carbonitriding temperature. The inventor confirmed that there is a similar tendency. Thus, it is considered that the preferable range of the a value obtained from the results of FIG. 11 is similar in the range of the general carbonitriding temperature and time.

By the results of an experiment similar to that set forth above on a workpiece formed of steel of various compositions, it was found that the above-described nitrogen permeating behavior is significantly exhibited in a workpiece formed of steel that contains at least 0.8 mass % of carbon. Therefore, the carbonitriding method of the present invention utilizing the nitrogen permeating behavior set forth above can be effectively applied to a workpiece formed of steel that contains at least 0.8 mass % of carbon. Steel containing carbon of at least 0.8 mass %, i.e. eutectoid steel and hypereutectoid steel, includes HS SUJ2 serving as bearing steel, SAE52100 and DIN standard 100Cr6 equivalent thereto, as well as HS SUJ3, and JIS SUP3, SUP4 serving as spring steel, JIS SK2, SK3 serving as tool steel, and the like.

It should be understood that the embodiments and examples disclosed herein are illustrative and nonrestrictive in every respect. The scope of the present invention is defined by the terms of the claims, rather than the description above, and is intended to include any modification within the scope and meaning equivalent to the terms of the claims.

INDUSTRIAL APPLICABILITY

The carbonitriding method and fabrication method of a machinery component of the present invention can be conveniently applied particularly to the carbonitriding method of a workpiece formed of steel that contains at least 0.8 mass % of carbon, and a machinery component fabrication method including the step of carbonitriding a workpiece formed of steel that contains at least 0.8 mass % of carbon. Moreover, the machinery component of the present invention is particularly suitable as a machinery component that requires fatigue strength and wear resistance.

The invention claimed is:

1. A carbonitriding method for carbonitriding a workpiece formed of steel that contains at least 0.8 mass % of carbon by heating in an atmosphere including ammonia, carbon monoxide, carbon dioxide, and hydrogen, the method comprising:
    an atmosphere control step of controlling an atmosphere in a heat treatment furnace, and
    a heating pattern control step of controlling a temperature history applied to said workpiece in said heat treatment furnace,
    wherein said atmosphere control step comprises
        an undecomposed $NH_3$ partial pressure control step of controlling a partial pressure of undecomposed ammonia in said heat treatment furnace, and
        a $CO/CO_2$ partial pressure control step of controlling the partial pressure of at least one of carbon monoxide and carbon dioxide in said heat treatment furnace, and
    said undecomposed $NH_3$ partial pressure control step and said $CO/CO_2$ partial pressure control step are carried out in said atmosphere control step such that $a_c^*$ defined by a following equation (1) is at least 0.88 and not more than 1.27, and α defined by equation (2) is at least 0.012 and not more than 0.020, where $P_N$ is the undecomposed ammonia partial pressure and $P_H$ is the hydrogen partial pressure in said heat treatment furnace, wherein $$a_c^* = \frac{(P_{CO})^2}{K \times P_{CO_2}} \quad (1)$$

$P_{CO}$: partial pressure of carbon monoxide (atm), $P_{CO_2}$: partial pressure of carbon dioxide (atm)
K: equilibrium constant at $<C> \pm CO_2 \Leftrightarrow 2CO$ $$\alpha = \frac{P_N}{0.006 \times (P_H)^{\frac{3}{2}}} \times \frac{(1.877 - 1.055 \times a_c^*)}{100}. \quad (2)$$

2. The carbonitriding method according to claim 1, wherein, in said undecomposed $NH_3$ partial pressure control step, the undecomposed ammonia partial pressure in said heat treatment furnace is measured, and said undecomposed ammonia partial pressure is compared with a target undecomposed ammonia partial pressure for a value of said a to be in a range of at least 0.012 and not more than 0.020 to adjust a flow rate of ammonia supplied into said heat treatment furnace per unit time.

3. The carbonitriding method according to claim 1, wherein
    said atmosphere control step further includes an $H_2$ partial pressure control step of controlling the partial pressure of hydrogen in said heat treatment furnace,
    in said $H_2$ partial pressure control step, a flow rate of hydrogen supplied to said heat treatment furnace per unit time is adjusted.

4. The carbonitriding method according to claim 3, wherein, in said $H_2$ partial pressure control step, the hydrogen partial pressure in said heat treatment furnace is measured, and said hydrogen partial pressure is compared with a target hydrogen partial pressure for a value of said a to be in a range of at least 0.012 and not more than 0.020 to adjust the flow rate per unit time of hydrogen supplied to said heat treatment furnace.

5. The carbonitriding method according to claim 1, wherein said heating pattern control step is carried out with a carbonitriding time determined based on a relationship of the carbonitriding time that is the time during which said workpiece is maintained at the temperature of at least $A_1$ point and a value of nitride permeating rate q defined by a following equation (3) to a nitride concentration at a region of a predetermined depth from the surface of said workpiece, determined for each composition of steel constituting said workpiece, wherein $$q = \beta(\alpha - N_s) \quad (3)$$

q: nitrogen permeating rate, $\beta$: nitrogen transition coefficient; $\beta = 1.7 \times 10^{-7}$, $N_s$: nitrogen concentration at workpiece surface.

6. A fabrication method of a machinery component, comprising:
   a steel member preparation step of preparing a steel member formed of steel that contains at least 0.8 mass % of carbon, and shaped roughly into a configuration of a machinery component, and
   a quench-hardening step of quench-hardening said steel member by cooling said steel member from a temperature of at least $A_1$ point to a temperature of not more than $M_s$ point, after said steel member prepared at said steel member preparation step is subjected to a carbonitriding process,
   wherein said carbonitriding process in said quench-hardening step is carried out using the carbonitriding method defined in claim 1.

\* \* \* \* \*